United States Patent [19]

Haley et al.

[11] Patent Number: 5,030,810
[45] Date of Patent: Jul. 9, 1991

[54] HEATING DEVICE

[75] Inventors: John M. Haley, Woodbridge; Stanley Worger, Stowmarket, both of England

[73] Assignee: British Telecommunications public limited company, Great Britain

[21] Appl. No.: 340,298
[22] PCT Filed: Aug. 19, 1988
[86] PCT No.: PCT/GB88/00686
§ 371 Date: Apr. 6, 1989
§ 102(e) Date: Apr. 6, 1989
[87] PCT Pub. No.: WO89/01401
PCT Pub. Date: Feb. 23, 1989

[30] Foreign Application Priority Data

Aug. 21, 1987 [GB] United Kingdom ............ 8719850

[51] Int. Cl.⁵ ............................................. F27B 5/14
[52] U.S. Cl. ............................ 219/385; 219/390; 219/521
[58] Field of Search .......... 219/385, 386, 390, 521, 219/535, 388

[56] References Cited

U.S. PATENT DOCUMENTS

| | | | |
|---|---|---|---|
| 1,492,821 | 5/1924 | Weinbach | 219/535 |
| 3,139,745 | 7/1964 | Sievers | 219/347 |
| 3,475,592 | 10/1969 | Berkl | 219/346 |
| 3,559,965 | 2/1971 | Ishida | 219/388 |
| 4,155,002 | 5/1979 | Cohen | 219/386 |
| 4,195,820 | 4/1980 | Berg | 219/390 |
| 4,295,033 | 10/1981 | Lindgren | 219/390 |
| 4,366,370 | 12/1982 | Moore | 219/535 |
| 4,423,516 | 12/1983 | Mellen | 219/390 |
| 4,460,820 | 7/1984 | Matsumoto | 219/385 |
| 4,605,161 | 8/1986 | Motomiya | 219/388 |
| 4,760,244 | 7/1988 | Hokynar | 219/390 |

FOREIGN PATENT DOCUMENTS

| | | | |
|---|---|---|---|
| 1388633 | 1/1965 | France | 219/390 |
| 52-67575 | 6/1977 | Japan | 219/390 |
| 57-53126 | 3/1982 | Japan . | |
| 58-171011 | 10/1983 | Japan . | |

Primary Examiner—Teresa J. Walberg
Attorney, Agent, or Firm—Nixon & Vanderhye

[57] ABSTRACT

A heating device primarily for shrinking heat recoverable sleeves for covering cable joints includes a cylindrical enclosure of two half-cylinder shells. Embedded electrical heating elements are energized under control of, e.g., a microprocessor, to control the temperature profile within the enclosure so that air entrapment within a sleeve during the shrinking process is avoided.

13 Claims, 1 Drawing Sheet

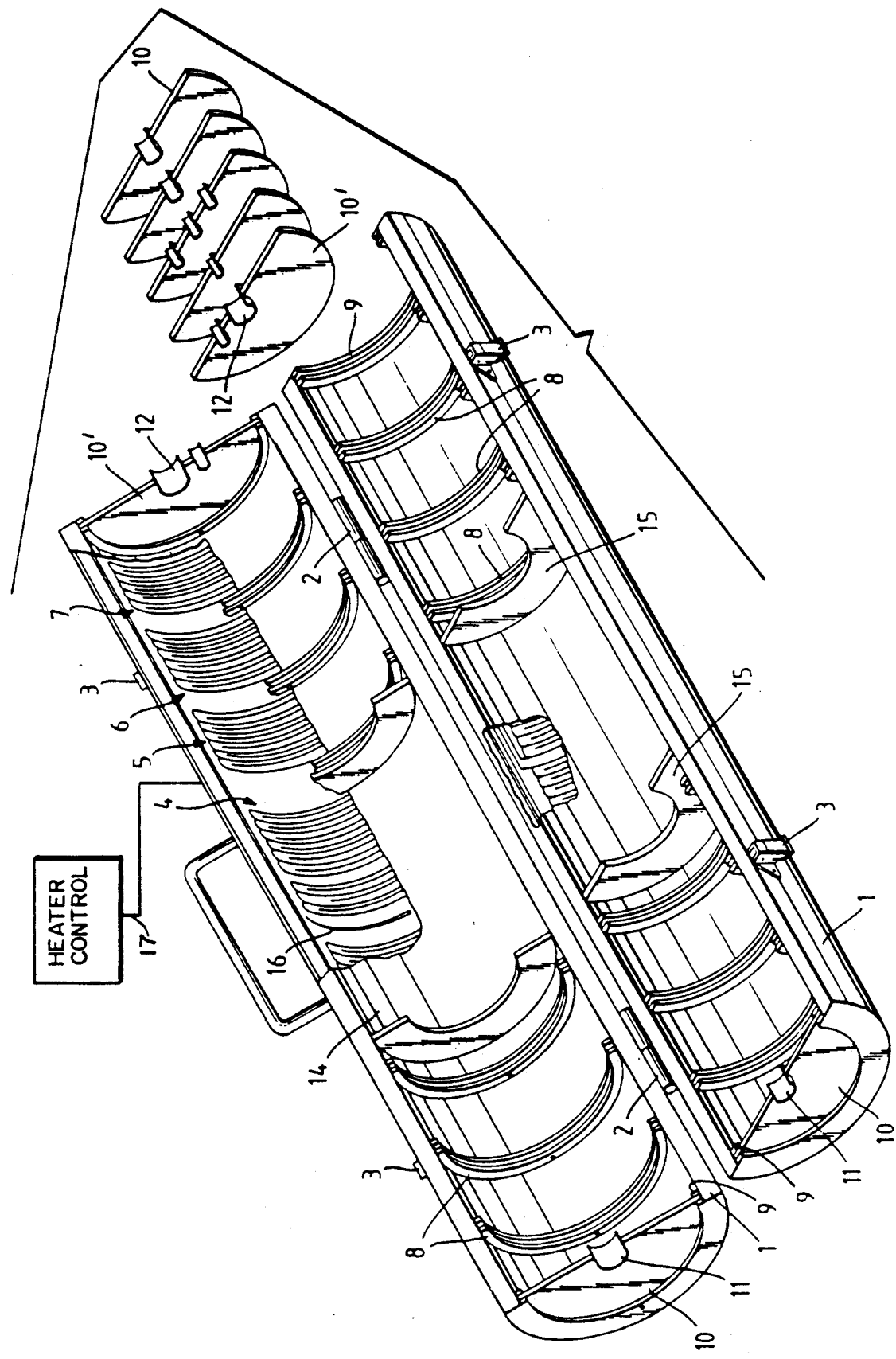

HEATING DEVICE

FIELD OF THE INVENTION

The present invention relates to a heating device, in particular to a heating device for heating heat recoverable articles and more particularly but not exclusively to such a device for effecting recovery of heat shrinkable cable closures.

BACKGROUND OF THE INVENTION

Heat recoverable sleeving is often used to protect joins in electrically conducting cables and in optical fibre signalling lines. In use, a sleeve is passed over one end of a cable, for example a cable having multiple pairs of signalling wires and, once jointing of one cable to another cable has been completed, the sleeve is relocated over the joint area, the sleeve spanning the ends of the respective insulating jackets of the cables. Alternatively after the joint has been formed a split sleeve is positioned over the jointing area and is sealed using a hot melt adhesive. Heating the sleeve causes it to shrink to grip tightly around the cable jacket and the joint area thereby effecting water resistance and insulation. Care must be taken during the shrinking operation to ensure that air entrapment is limited.

Thus, for example, if the ends of a sleeve are recovered too rapidly so that sealing of the sleeve to the insulating cable jackets prevents air from escaping then the central portion of the sleeve may be prevented from shrinking fully onto the joint area by the entrapped air. Accordingly skilled operators are employed to effect the shrinking operation usually by applying a gas torch to the sleeve area, moving the torch from the center toward the ends.

However, as will be appreciated, many such jointing operations are performed in restricted areas such as in underground cable chambers where the effects of combustion products may be dangerous to the operator. Furthermore, the use of a naked flame in such chambers, in which a build up of combustible or explosive gases is possible, should preferably be avoided.

One solution to the above problem has been to incorporate sacrificial heating elements into the sleeving (see for example EP38659 and EP52476) or to lay a sacrificial heating element into the joint prior to positioning the sleeve for example using the method of WO 84/03346. Application of an electrical current to the heating elements then effects shrinkage.

However, sleeving including such elements is necessarily more expensive to produce since the heating wires are not available for further use and control of the application of heat to ensure central shrinkage prior to end shrinkage may be difficult to achieve.

One method of ensuring distribution of heat in a suitable manner for use in a fixed situation, for example at a manufacturing site, is disclosed in EP179606. In the aforementioned specification there is disclosed a bench mounted heating device having a centrally disposed heating element and an elongate plate of thermally conductive material. Thus, by placing a sleeved joint on the plate and then applying power to the heating element the central portion reaches recovery temperature very quickly while the outer portions reach that temperature more gradually. Such a device may not be suitable for use on sleeves which have a large diameter since only one area, that which is in contact with the plate, would readily reach the required temperature. Furthermore such a device is not necessarily suited to be adapted for use in the field.

SUMMARY OF THE INVENTION

It is therefore one object of the present invention to provide a portable heating device capable of effecting recovery of a heat shrinkable article in a controllable manner.

According to the present invention there is provided a heating device for applying heat to heat recoverable articles the device comprising a body forming an enlongate enclosure the interior of which has a plurality of electrical heating elements spaced apart longitudinally of the body, each of the heating elements being indepently energisable whereby the longitudinal temperature profile within the enclosure may be controlled.

Preferably the body comprises two half cylinders hinged on one side to simplify access to the enclosure.

The body may have removable end plates which include apertures through which one or more cables may pass. The end plates may be relocated to reduce the size of the enclosure which may also include one or more support plates and/or thermal baffles.

A control circuit may be provided, the circuit being arranged to cause sequential energisation of the heating elements. The sequence may have a predetermined time interval between each step thereof or the circuit may be reponsive to one or more thermal sensors included in the enclosure so that the energisation sequence is related to the actual temperature profile of the enclosure.

BRIEF DESCRIPTION OF THE DRAWINGS

A heating device in accordance with the invention will now be described by way of example only with reference to the accompanying drawing which is an isometric view of a heating device for effecting shrinkage of heat recoverable cable joint sleeve.

DETAILED DESCRIPTION OF THE DRAWINGS

Referring to the drawing the device comprises a housing in the form of two half cylinders 1 of thermally insulating material. The two half cylinders 1 are linked together by "lift-off" hinges 2 on one edge and have the respective halves of a clamp arrangement 3 of known kind on the opposed edges. Thus the two half cylinders 1 may in use be locked together using the clamps 3 to form a cylindrical oven enclosure.

Embedded in the walls of the body a number of groups of electric heating elements 4 to 7 (only some of which are shown) are provided, each having an individual connection wire (not shown) for power to be supplied via cable 17 from a controller 16. Between each group of heating elements 4 to 7, and at each end of the half cylinders, mounting guides 8, 9 are provided to which end plates 10 may be fitted.

Each end plate 10 includes one or more semicircular grooves 11 arranged on closure of the cylinder to form an aperture. The groove 11 each carry a support plate 12 which, in use, provides support to the ends of a jointed cable (not shown). Several pairs of interchangable end plates may be provided to cater for different cable sizes. For example the end plates 10 are adapted for use with a single cable of a larger diameter while the end plate 10' takes a similar cable and a smaller cable. Other exemplary end plates for a single smaller diameter cable, three such cables and a cable of intermediate diameters are also shown.

For the avoidance of doubt the term cable as used herein includes not only multi cored electrical signalling cables but also cables comprised of multiple optical fibres, co-axial cables and the like.

The interior of the half cylinder shells 1 comprises a heat radiating surface 14 which is preferably coated with a "non-stick" material such as Teflon (trademark) to facilitate the removal of (e.g.) hot melt adhesives which may have been used in the jointing process.

As shown in the diagram, adjacent the groups of heating elements 4 nearest the longitudinal centre of the enclosure a further pair of plates 15 are provided. The plates 15 have two functions the first of which is to give support to a cable when it is in the enclosure and the second of which is to act as a thermal baffle to prevent premature temperature rises along the length of the cylinder.

It will be realised that, as with the end plates 10, the plates 15 may be located in different positions along the length of the half cylinders 1 either using the same mountings 8 or additional mountings (not shown). It will also be appreciated that the plates 15 may carry extensions similar to the shells 12 to provide additional longitudinal support.

To facilitate the control of the temperature profile along the length of the enclosure one or more thermal sensors 16 may also be incorporated in the walls of the shells 1.

In use, where two or more cables are to be joined a suitable heat recoverable sleeve is selected and placed over one of the cables. Once jointing or splicing of the cable is completed, the joint area may be coated with a hot melt adhesive if required and the sleeve positioned thereover. Alternatively a split sleeve pre-coated with hot melt adhesive is selected and wrapped over the joint area after completion of splicing or jointing.

Suitable end plates 10 are selected and placed in respective mountings 8, 9 in dependance upon the length of the joint to be sealed together with intermediate support/tnermal baffle plates 15 as necessary. The two half shells 1 are then positioned so that the jointed cables rest in the supports 12 and the enclosure is closed and locked together using the clamps 3. Connection leads from the heating elements 4 to 7 and the thermal sensor(s) 16 may now be connected to the controller. The operator provides the joint parameters on the controller, for example the type and length of joint, the kind of sleeving in use and starts the sequence.

The controller, which may be conveniently controlled by a microprocessor, now steps through a predetermined heating sequence releasing the operator to perform other tasks.

In a typical sequence the microprocessor first causes the two groups of elements 4 closest to the center of the enclosure to be energised for a short period of time which may be either a predetermined period (say five minutes) or may be until a predetermined temperature as determined by the sensor 16 is reached.

This initial heating of the central area of the joint ensures that shrinkage of that portion of the recoverable sleeve occurs before any likelihood of the sleeve sealing to the insulated sleeving of the cables thereby allowing entrapped air to escape.

In the next step, the microprocessor causes the next to centre groups of elements 5 to be energised again for a predetermined period or until a given temperature is sensed during which period the elements 4 may either remain energised or be turned off as required. The groups of elements 6 and 7 may then be energised in turn. It will be realised that a combination of the time and temperature factors may be used such that at each step mentioned above a predetermined period elapses after a predetermined temperature is reached prior to proceeding to the next step.

Whilst as herein described the elements are controlled to heat a central area first progressing outwardly to the ends it will be appreciated that the longitudinal temperature profile of the enclosure may be controlled in any required manner. For example if sealingof one end is preferred prior to sealing of the opposed end then the sequence may be arranged to energise the elements in the order 7, 6, 5, 4 followed by the corresponding elements in the order 4, 5, 6, 7 at the opposed end of the cylinders.

Further although the device has been described with reference to a preformed heat recoverable sleeve other thermally responsive mechanisms such as sheets of material wrapped around a joint may be used.

I claim:

1. A heating device for applying heat to a heat recoverable article, the device comprising:
   an elongate body forming an enclosure for substantially enclosing said article;
   the longate body being formed in two parts whereby one part is movable relative to the other part to allow said article to be inserted therebetween, the said parts of the body having a generally cylindrical inner surface;
   the interior of said body including a plurality of electrical heating elements spaced apart longitudinally of the body and disposed to substantially follow the contours of the inner surface;
   each of the heating elements being independently energisable whereby the longitudinal temperature profile within the enclosure may be controlled.

2. A heating device as in claim 1, wherein the body is formed in two parts interconnected by a hinge whereby access to the enclosure is simplified.

3. A heating device as in claim 1 wherein ends of the body are closed by removable end plates.

4. A heating device as in claim 3 wherein the end plates include at least one aperture to permit the device to surround a portion of one or more cables.

5. A heating device as in claim 1 wherein at least one support plate is located within the enclosure whereby an elongated article surrounded by the body may be additionally supported towards the longitudinal center of the enclosure.

6. A heating device as in claim 1 wherein a thermal baffle is located intermediate at least one pair of the plurality of heating elements.

7. A heating device as in claim 1 further comprising a control circuit arranged to cause sequential energisation of the plurality of heating elements.

8. A heating device as in claim 7 wherein the control circuit is arranged to cause energisation of the heating element or elements closest to the longitudinal center of the enclosure before causing energisation of heating elements disposed towards the ends of the enclosure.

9. A heating device as in claim 7 wherein the control circuit is arranged to cause energisation of the heating elements in a predetermined sequence with a predetermined period of time between each step of the sequence.

10. A heating device as in claim 7 further comprising at least one thermal sensor located in the enclosure whereby the sequential energisation of the heating elements may be dependent upon the actual temperature profile of the enclosure.

11. A heating device for applying heat to a heat recoverable article, the device comprising:
   an elongate body forming an enclosure for substantially enclosing said article, the ends of the body being closed by removable end plates;
   the interior of said body including a plurality of electrical heating elements spaced apart longitudinally of the body;
   each of the heating elements being independently energisable whereby the longitudinal temperature profile within the enclosure may be controlled, and wherein said body includes mounting means intermediate at least one pair of the said plurality of elements whereby at least one of the said end plates may be relocated to reduce the length of the enclosure.

12. A heating device for applying heat to a heat recoverable article, the device comprising:
   an elongate body forming an enclosure for substantially enclosing said article,
   said body being closed by removable end plates which include at least one aperture to permit the said body to surround a portion of one or more cables and said end plates being interchangeable with other removable end plates containing different apertures from the said end plates,
   the interior of said body including a plurality of electrical heating elements spaced apart longitudinally of the body, and
   each of the heating elements being independently energisable whereby the longitudinal temperature profile within the enclosure may be controlled.

13. Apparatus for heat treating a heat-shrinkable sleeve member disposed about a cable splice while the cable is stationary within the apparatus, said apparatus comprising:
   an elongated multi-part enclosure with apertures at each end to accommodate cable disposed therethrough and having a hinged connection between at least two parts thereof so as to accommodate placement of a cable into place within the enclosure with the cable passing through said apertures and with a cable splice having a surrounding heat-shrinkable sleeve member located proximate a central portion of said enclosure;
   plural electrical heating elements disposed within said enclosure and longitudinally spaced apart therewithin in both directions from said central portion; and
   an electrical control circuit connected to said heating elements for energizing same,
   said heating elements being spaced and/or controlled to produce a non-uniform uneven temperature profile longitudinally within said enclosure with respect to space and/or time so as to insure sequential heat shrinking of progressively disposed portions of said heat-shrinkable sleeve member as it lies stationary within the enclosure thus substantially avoiding trapped air pockets within the heat shrunk sleeve member.

* * * * *